Dec. 15, 1942.  M. W. CREW  2,304,802
PRESSURE CONTROLLER
Filed July 28, 1941

INVENTOR
MORRIS W. CREW
BY
Hyde and Meyer
ATTORNEYS

Patented Dec. 15, 1942

2,304,802

UNITED STATES PATENT OFFICE 2,304,802

PRESSURE CONTROLLER

Morris W. Crew, Cleveland, Ohio, assignor to The Hotstream Heater Company, Cleveland, Ohio, a corporation of Ohio Application July 28, 1941, Serial No. 404,306

1 Claim. (Cl. 200—83)

This invention relates to a device for controlling any regulating equipment electrically when actuated by the pressure within a system. In other words, this invention relates to improvements in a pressure control device which in turn controls electric circuits.

An object of the present invention is to provide pressure actuated means for closing and opening electric circuits when the pressure is increased or decreased from a predetermined neutral point.

Another object of the present invention is to provide novel means for producing a step by step operation of regulating equipment in response to changes in pressure.

Other objects and advantages of the present invention will appear from the accompanying description and drawing and the essential features thereof will be set forth in the appended claim.

Figure 1:
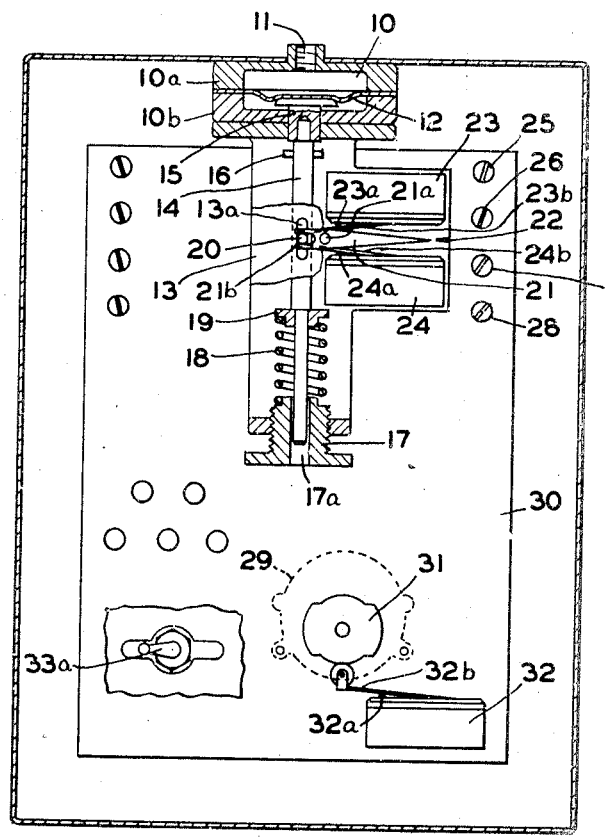
Figure 2:
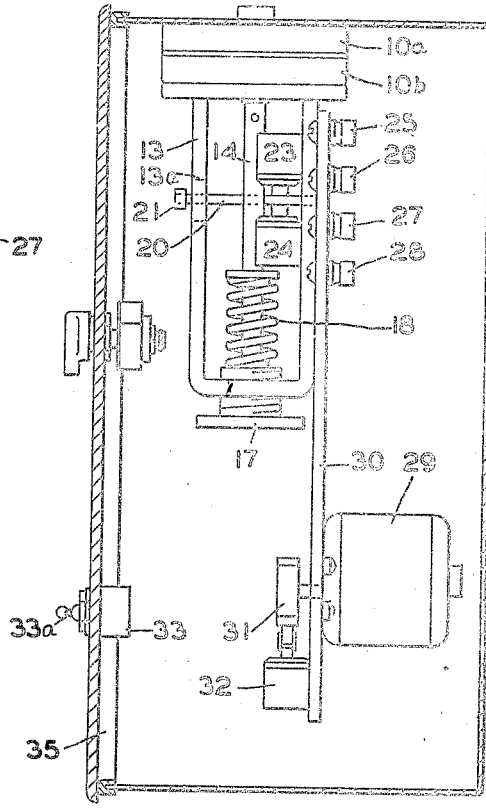
Figure 3:
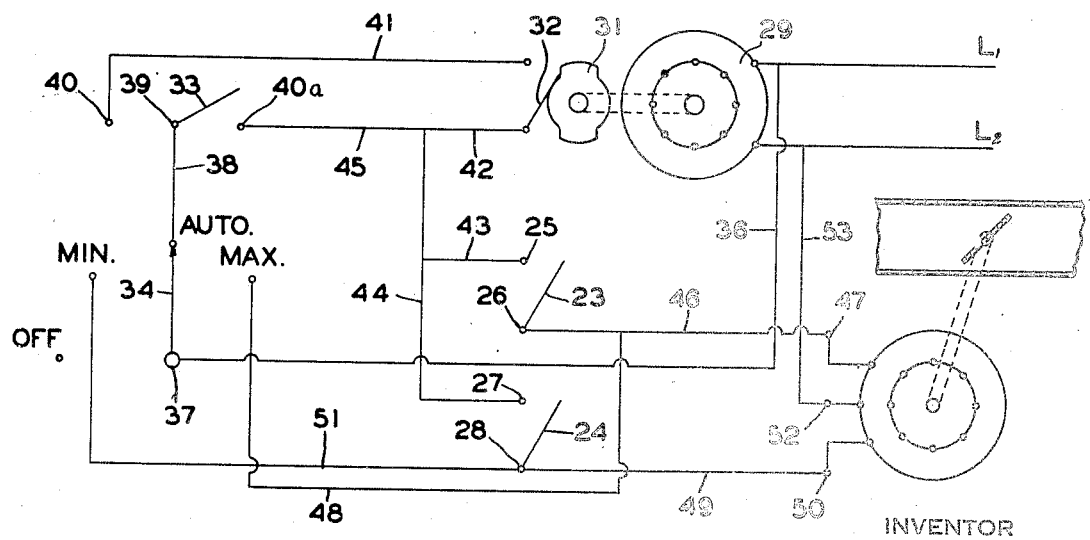

In the drawing, Fig. 1 is a front elevation of my improved pressure controller with the front of the instrument casing removed and with certain of the parts broken away or in section to more clearly show the construction; Fig. 2 is an elevational view of the instrument of Fig. 1, taken from the right-hand side of that view; while Fig. 3 is a wiring diagram illustrating one use of my equipment.

It will be obvious to those skilled in this art that my invention is useful in many industrial applications. For simplicity, however, I shall describe the same in connection with the control of steam pressure in a system within desired limits wherein my control device is operated by the steam pressure in the system to produce movements of electrically controlled equipment for varying the steam pressure. It will be well understood that such electrical equipment may be used to control a boiler draft damper, fan pressure connected with the boiler, stoker speed, oil burner valves and the oil burner air ports, speed of chain grate stokers, or fuel bed control apparatus on other types of stokers. Any of these control devices serve to increase or decrease steam pressure in the system so as to hold it at a predetermined point which is the function of my improved pressure controller here described. My invention will be described in connection with such a system, it being understood that other applications are possible within the scope of my claim.

The device shown in Figs. 1 and 2 comprises means forming a pressure chamber 10 which is adapted to be connected by a conduit threaded into the boss 11 with a steam pressure system. I intend that my device should be placed below the steam line so that the pipe connected at the point 11 and the chamber 10 will be filled with condensate, thus giving a more accurate and dependable instrument. The lower side of the pressure chamber comprises a flexible diaphragm wall 12, the diaphragm being held between the parts 10a and 10b of the pressure chamber housing.

An open bracket 13 rigid with the member 10b extends downwardly therefrom and serves to guide the parts controlling the electrical circuits in response to changes in steam pressure. A rod 14 is provided with a pressure head 15 engaging the lower face of diaphragm 12. This pressure head has a portion slidable in the member 10b and in bracket 13 thus also serving as a guide for the upper end of the rod 14. A pin 16 limits upward movement of rod 14. The lower end of the rod extends through a central bore 17a in the adjusting nut 17 which has threaded engagement with the bottom of bracket 13. A spring 18 encircles the rod 14 and is held between the adjusting nut and a collar 19 which engages a suitable shoulder on the rod 14. By turning the nut 17 the desired stress is imparted to spring 18 to oppose the pressure in chamber 10. This determines the normal pressure to be maintained in the system by my improved device. Rigidly mounted in the rod 14 is a pin 20 which extends through a slot 13a in one of the side members of the bracket 13. A pointer 21 is pivotally mounted on the bracket 13 at the point 21a and is provided with a bifurcated end 21b embracing the pin 20. Thus as the pin 20 moves up and down in response to pressure changes in the chamber 10, the free end of the pointer 21 is oscillated relative to a fixed marker 22. When the pointer is opposite the marker the control device is in neutral position as will presently appear.

Fixed on a portion of the bracket 13 are two switches 23 and 24. The switch 23 has two terminals connected to the binding posts 25 and 26 by connections, not shown in Figs. 1 and 2, but diagrammatically illustrated in Fig. 3. In like manner the switch 24 has terminals connected to the binding posts 27 and 28. The switch 23 has an actuating button 23a which is operable by a flexible blade 23b which lies with slight clearance on the upper side of pin 20. The switch 24 has an operating button 24a which is actuated by a flexible blade 24b which lies with slight clearance near the lower side of pin 20. When the parts are in the neutral position of Fig. 1, neither switch is actuated. When pin 20 moves upward it actuates switch 23 and when it moves downward from the neutral position it actuates switch 24. As here described these are normally open switches but they might be normally closed switches if desired.

The switches 23, 24 and 32 may be of any suitable type but those here shown are of the type described and claimed in Patent No. 1,960,020, granted May 22, 1934, to P. K. McGall. These switches are operable by a very slight movement (say, of a few thousandths of an inch) of the operating button and they are therefore particularly adapted for use in connection with the pressure controlled pin 20.

It is generally desirable in a device of this sort to provide a movement of the electrical control apparatus in response to pressure in the chamber 10 and then to have an inoperative period until the regulating device shall have produced an effect upon the pressure in the chamber 10 before calling for further movement of the regulating apparatus. In other words, if the pressure in chamber 10 is too high and some regulating device, such as a damper, is closed to decrease boiler draft in response to operation of switch 24, then it is advisable to wait a brief period for the effect of the decreased draft on the pressure in chamber 10 before causing further movement of the control damper. To this end I have provided a step by step operation of my device which is intended to prevent overrunning or hunting of the control device.

In the form here shown, a motor 29 is mounted in fixed position, preferably on the board 30 which is supported by the bracket or some other suitable part connected with the casing of the device. On the shaft of this motor is mounted a cam 31 adapted to engage the operating blade 32b which actuates the button 32a of a normally open switch 32 mounted on the board 30.

The motor 29 is preferably provided with a reduction gearing so that the cam 31 makes about one revolution per minute, although it will be understood that the timing of the cam 31 may be made to satisfy any given set of conditions. Preferably the circuits are so arranged that the step by step action of cam 31 may be utilized in connection with the rest of the control device or may be dispensed with according to the position of a single pole double throw switch 33 controlled by the manual 33a which may be mounted on the front of the casing.

A control switch 34 is also mounted on the front of the casing 35 and this switch has four control positions as indicated in Fig. 3. When thrown to the minimum position the draft damper for instance would be thrown to its closed position and when thrown to the maximum position the damper would be thrown to a wide open position. Whereas when the switch is thrown to the automatic position as shown in full lines in Fig. 3, the device operates automatically to hold a predetermined temperature.

Referring now to Fig. 3, the motor 29 is connected across the line L1, L2 so that it will operate constantly although it will be readily understood that this motor may be shut down at any time desired by introducing the proper control circuits. The line L1 is also connected by line 36 with the terminal 37 of switch 34. The automatic button of this control switch is connected by line 38 with the common terminal 39 of switch 33. One terminal of this switch at 40 is connected through line 41 with one of the terminals of switch 32. The other terminal of switch 32 is connected through lines 42 and 43 with terminal 25 of switch 23 and by line 44 with terminal 27 of switch 24. Terminal 40a of switch 33 is directly connected by line 45 to lines 43 and 44. Terminal 26 of switch 23 is connected by line 46 with binding post 47 which in turn is connected to one side of the electrical control device for operating it in a direction to increase steam pressure. For instance the binding post 47 might be connected to one side of a reversible motor connected to a draft damper in a direction to operate the motor to open the damper. The maximum button for control switch 34 is connected by lines 48 and 46 to binding post 47 also. Terminal 28 of switch 24 is connected by line 49 with binding post 50 which in turn is connected to that side of the control device for operating it in a direction opposite to that described in connection with binding post 47. For instance, binding post 50 might be connected to the other side of a reversible motor connected to a draft damper in a direction to operate the motor to close the damper. The minimum button for switch 34 is connected by lines 51 and 49 to binding post 50 also. A common wire for the electrical control device operated in opposite directions by the connections at 47 and 50 comes into binding post 52 and is connected by line 53 at L2.

It is believed the operation of the device will now be apparent. With the pressure system connected to the chamber 10, the adjusting nut 17 is turned to that position which causes the pointer 21 to assume that neutral position shown in Fig. 1 when the pressure in the system is that desired. If the interrupter device is to be used, the switch 33 is thrown to that position where it connects terminals 39 and 40. If the interrupter is not desired then obviously the switch 33 is thrown in the other direction to connect terminals 39 and 40a. Assuming that the interrupter is used, however, then if the pressure in chamber 10 becomes too great, pressure on the diaphragm 12 will move rod 14 and pin 21 downwardly, thus almost immediately pressing against the blade 24b and closing switch 24. This completes a circuit from L1 through line 36, terminal 37, switch 34, line 38, switch 33, line 41 and switch 32 (during such time as cam 31 closes this switch), lines 42 and 44, switch 24, line 49, binding post 50 through the electrical control device back through binding post 52 and line 53 to L2. This will operate the control device in a direction to close the draft damper and decrease the steam pressure. After approximately fifteen seconds the cam 31 will open switch 32 and then after an interval of about fifteen seconds the cam will close switch 32 again. If the steam pressure in chamber 10 still keeps switch 24 closed, the process will be repeated until the draft damper is closed sufficiently to decrease the steam pressure to the desired normal point.

If pressure in chamber 10 drops below normal, switch 23 is closed and a circuit is completed through line 46, binding post 47, the control device, binding post 52 and line 53 to L2. This will operate the control device step by step to open the draft damper until the steam pressure is again increased to the normal point.

The switches 23 and 24 are very sensitive and require very little change of pressure in chamber 10 to operate them. If the blades 23b and 24b are set close to pin 20, the pressure in chamber 10, and in the controlled system, may be held within an unbelievably narrow range.

What I claim is:

In a controller of the class described, means providing an expansible pressure chamber, an element movable in response to expansion of said chamber, a pair of electric switches having their respective actuators movable in opposite directions for switch closure, two yieldable connections between said element and said switches, one for each switch, said connections lying respectively on opposite sides of said element for movement thereby alternatively in switch closing direction and each connection permitting movement of said element beyond switch-actuating position, a third switch means connected in series circuit with each of said two first named switches, and timed means for periodically opening and closing said third switch means.

MORRIS W. CREW.